United States Patent
Ravi et al.

(10) Patent No.: US 7,529,669 B2
(45) Date of Patent: May 5, 2009

(54) VOICE-BASED MULTIMODAL SPEAKER AUTHENTICATION USING ADAPTIVE TRAINING AND APPLICATIONS THEREOF

(75) Inventors: Srivaths Ravi, Plainsboro, NJ (US); Anand Raghunathan, Plainsboro, NJ (US); Srimat Chakradhar, Manalapan, NJ (US); Karthik Nandakumar, East Lansing, MI (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 11/762,616

(22) Filed: Jun. 13, 2007

(65) Prior Publication Data
US 2008/0059176 A1    Mar. 6, 2008

Related U.S. Application Data

(60) Provisional application No. 60/804,670, filed on Jun. 14, 2006.

(51) Int. Cl.
*H04M 1/64* (2006.01)
*G10L 15/00* (2006.01)

(52) U.S. Cl. ............... 704/249; 379/88.02; 704/231; 704/246; 704/250

(58) Field of Classification Search ........... 704/246, 704/249, 250
See application file for complete search history.

(56) References Cited

U.S. PATENT DOCUMENTS 6,088,428 A * 7/2000 Trandal et al. .......... 379/88.02

OTHER PUBLICATIONS

Schalkwyk et al. 'Speaker Verificatino With Low Storage Requirements', 1996 IEEE International Conference on Acoustics, Speech, and Signal Processing, 1996. ICASSP-96. Conference Proceedings., May 7-10, 1996 pp. 693-696.*

* cited by examiner

*Primary Examiner*—David R Hudspeth
*Assistant Examiner*—Justin W Rider
(74) *Attorney, Agent, or Firm*—Brosemer, Kolefas & Associates

(57) ABSTRACT

A voice based multimodal speaker authentication method and telecommunications application thereof employing a speaker adaptive method for training phoneme specific Gaussian mixture models. Applied to telecommunications services, the method may advantageously be implemented in contemporary wireless terminals.

8 Claims, 5 Drawing Sheets

Enrollment

Authentication

VOICE-BASED MULTIMODAL SPEAKER AUTHENTICATION USING ADAPTIVE TRAINING AND APPLICATIONS THEREOF

CROSS REFERENCE TO RELATED APPLICATIONS

This application claims the benefit of U.S. Provisional Application No. 60/804,670 filed Jun. 14, 2006 the entire contents of which are incorporated by reference as if set forth at length herein.

FIELD OF THE INVENTION

This invention relates generally to the field of speaker recognition and in particular to an authentication method that utilizes adaptive training as applied to wireless telephony networks.

BACKGROUND OF THE INVENTION

Voice based speaker recognition has been anticipated as a convenient method for establishing a user's identity (authentication) in mobile terminals since it may be implemented without additional hardware and can therefore be applied to existing terminals. Unfortunately, voice based authentication suffers from poor accuracy as compared with other biometric authentication methods, i.e., fingerprint, retinal scan.

SUMMARY OF THE INVENTION

According to an aspect of the present invention an authentication method is developed that employs a speaker adaptive mechanism for training phenome specific speaker models. Advantageously, the method employs acoustic models of the speaker at the phenome level thereby improving authentication accuracy.

According to another aspect of the invention, the authentication method is applied to mobile terminals in a wireless environment wherein a speaker is authenticated before, during or after call establishment. The result of that authentication determines whether the call is permitted to continue or not.

The details of one or more embodiments of the invention are set forth in the accompanying drawings and the description below. Other features, objects and advantages of the invention will be apparent from the description, drawings and claims.

BRIEF DESCRIPTION OF THE DRAWING

A more complete understanding of the present invention may be realized by reference to the accompanying drawing in which.

DETAILED DESCRIPTION

The following merely illustrates the principles of the invention. It will thus be appreciated that those skilled in the art will be able to devise various arrangements which, although not explicitly described or shown herein, embody the principles of the invention and are included within its spirit and scope.

Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

By way of some additional background, early speaker verification systems used methods such as dynamic time warping (DTW) and vector quantization (VQ) source modeling to determine similarities between features extracted from input speech and a template model. Subsequently, stochastic models were developed that characterized features of a speaker's voice that employed a pattern matching methodology whereby the likelihood of a particular set of observations i.e., a collection of feature vectors from an unknown speaker, is determined given a target speaker model.

Once the likelihood values are determined, the problem of classifying an input speech sample as either a "match" or a "non-match" with respect to a target speaker model may be posed as a hypothesis testing problem. For example, if we let $L_{sp}$ be the likelihood that the collection of observed feature vectors (X) are derived from a speech sample of a target speaker, and let $L_{bg}$ be the likelihood that the observed feature vectors are derived from an impostor speech sample, then the well-known Neyman-Pearson theorem states that the optimal test for deciding between a "match" and a "non-match" is the likelihood ratio test. Stated alternatively, the decision is a "match" only if $L_{SP/L_{BG}} \geq T$, where T is the decision threshold. Normally, the value of T is chosen such that the number of false accepts and false rejects are acceptable numbers.

Figure 1:
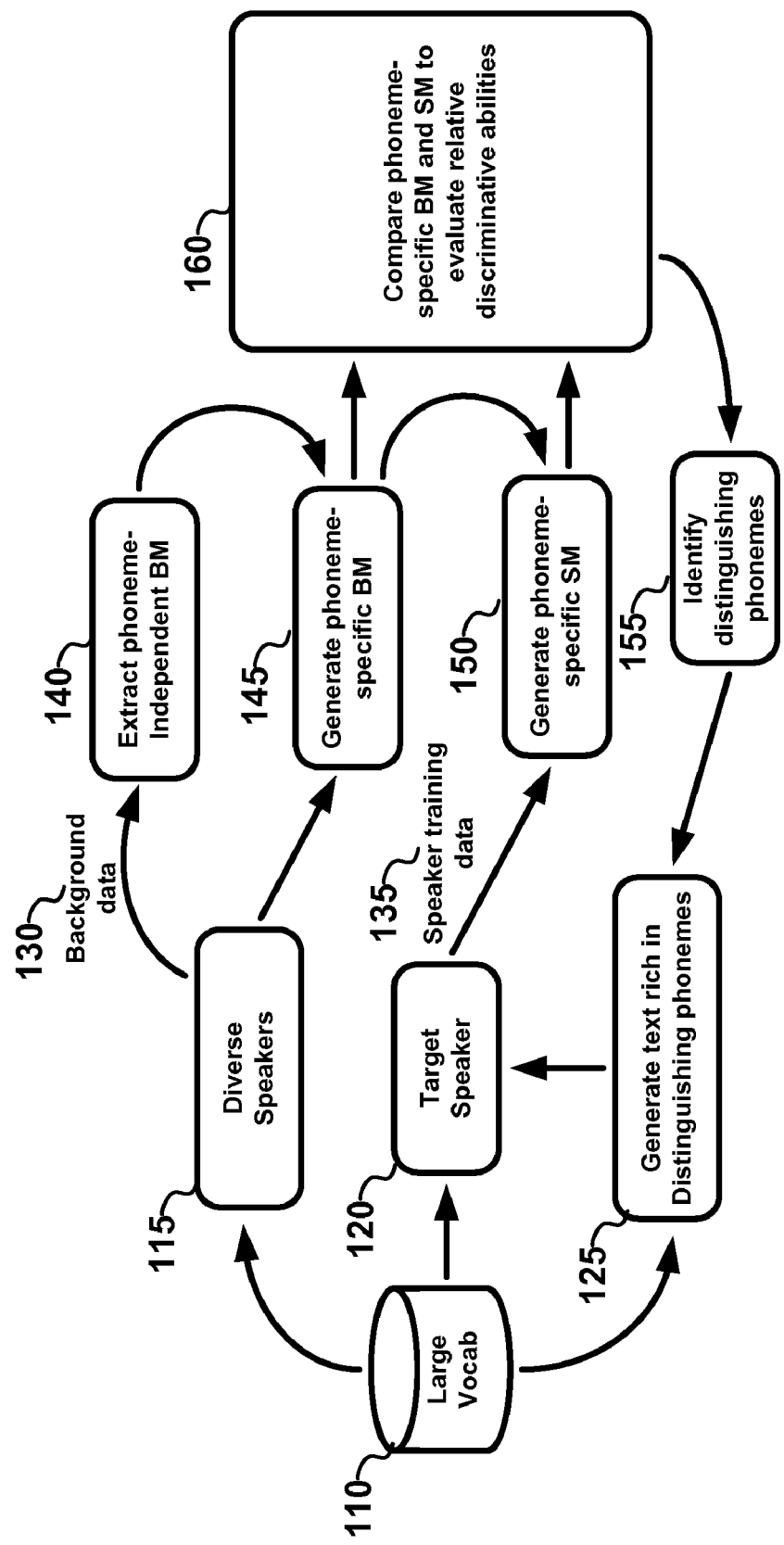
FIG. 1 shows the overall steps associated with an adaptive multimodal training method according to the present invention.

With initial reference to FIG. 1, there is shown a diagram depicting the steps associated with an adaptive multimodal training according to the present invention. As shown in that FIG. 1, from a database containing a relatively large vocabulary 110, background and speaker training data is extracted through the prompting of phoneme-balanced text. A phoneme independent background model 140 is constructed from which a phoneme specific background model 145 and a phoneme specific speaker model 150 are created for a set of diverse speakers 115 and a target speaker 120, respectively.

According to the present invention, the phoneme specific model 150 and phoneme specific background model 145 are compared to evaluate relative discriminative abilities 160. Advantageously, a distance measure known in the art as the "Earth Mover's Distance Metric" is used. This allows the identification of distinguishing phonemes 155 that distinguish a speaker from background data, and automatically generate new text samples 125 that are rich in these distinguishing phonemes. Accordingly, the new text samples are used to adapt the phoneme specific SMs so that resulting speaker models corresponding to the distinguishing phonemes are fine-tuned. When these new, fine-tuned models are used in a speaker verification phase, the discriminative power of the model in distinguishing the original speaker from an imposter improves significantly.

Figure 2:
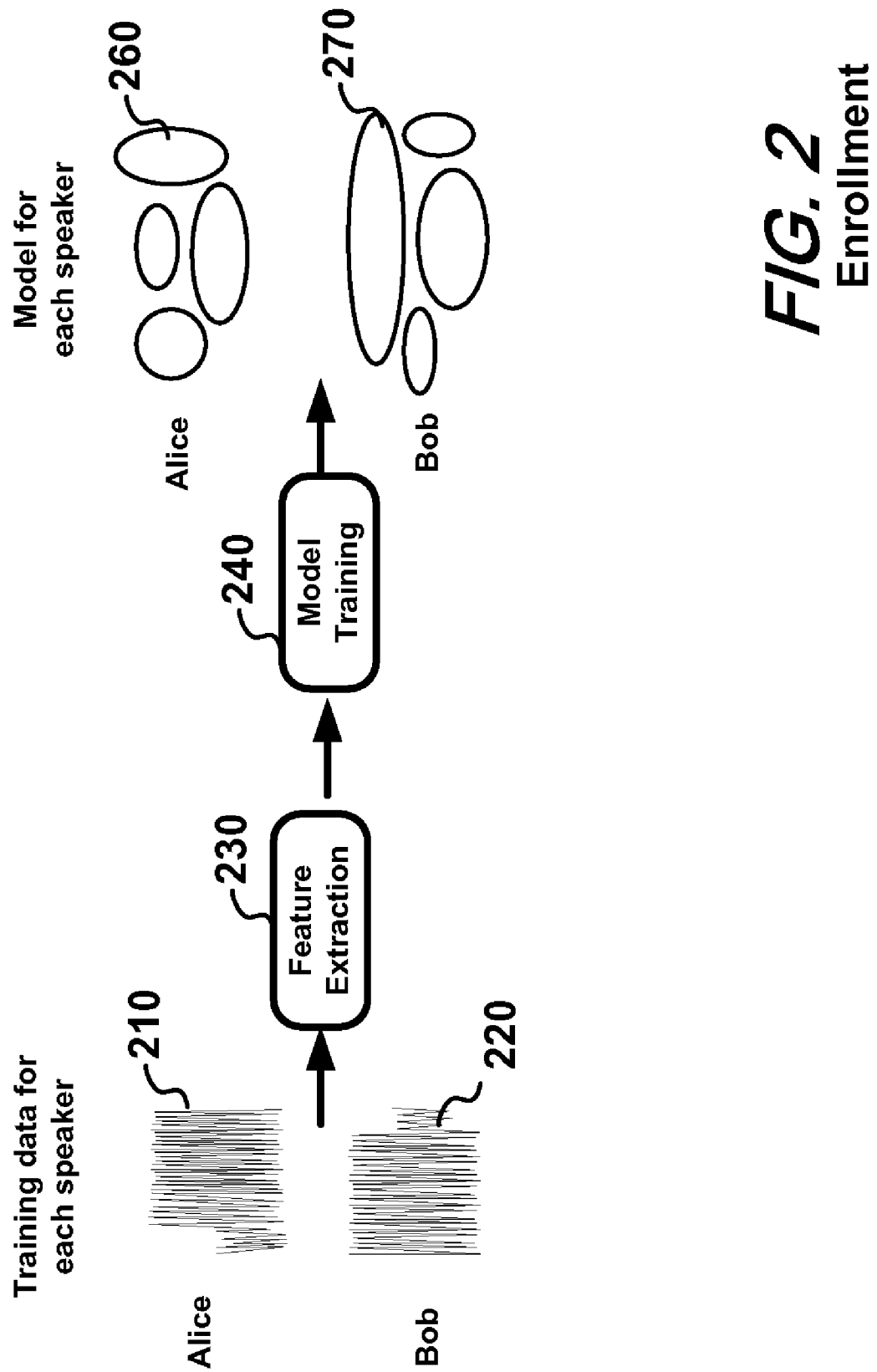
FIG. 2 shows the steps associated with an enrollment of a speaker for speaker authentication according to the present invention.
Figure 3:
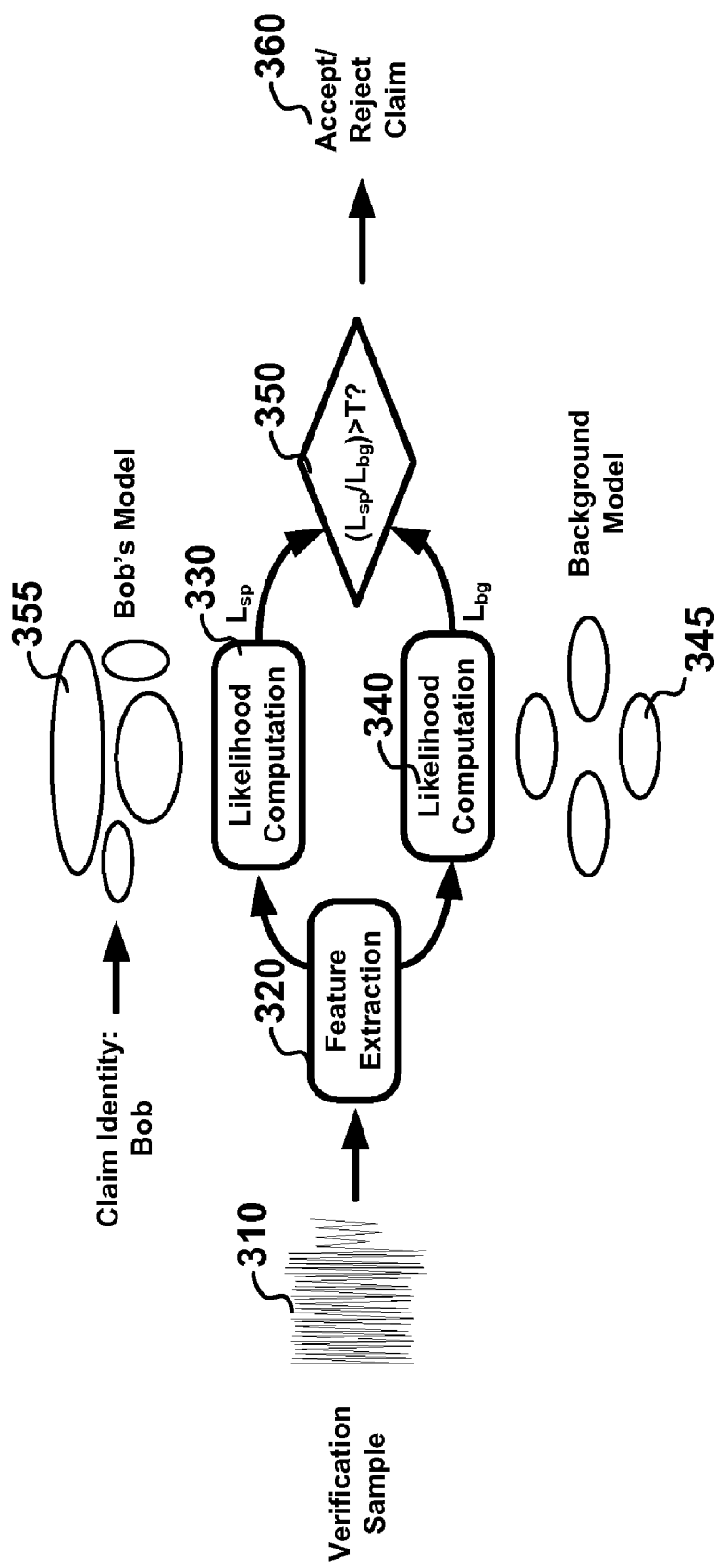
FIG. 3 shows the steps associated with an authentication of the speaker according to the present invention.

The framework and steps associated with speaker verification based on the stochastic speaker modeling and the likelihood ratio test according to the present invention are shown pictorially in FIG. 2 and FIG. 3. As can be observed from these two figures, there are two distinct stages in this framework, namely, an enrollment phase (FIG. 1) and an authentication phase (FIG. 2).

One goal of the enrollment phase is to learn the parameters of the model used for each target speaker and the parameters of the corresponding impostor models. More particularly, training data for each speaker 210, 220 are collected and sets of features are extracted from each 230. Using extracted features, a model is trained 240 and individual models for each one of the speakers is generated 250, 255.

Once the models 250, 255 are generated, authentication may proceed. The authentication phase is shown in FIG. 3. In particular, a speech verification sample 310 is obtained from a speaker and a number of features—more particularly cepstral coefficients—are extracted 320 from the speech sample 310. Due to the limited availability of training data, a common speaker-independent impostor model (also known as universal background model) is constructed a-priori for all users 345. As the speaker of the verification sample 310 claims an identity of an individual, a model associated with that claimed person 355 is used to determine a likelihood of the extracted features 320 being found in the claimed identity model 355. Similarly, a likelihood determination 340 is made for the extracted features 320 and the background model 345. Based upon these two likelihood determinations 330, 340, a determination 360 is made about the identity of the speaker based upon the ratio 350 of the two determined likelihoods.

The use of Gaussian mixture models (GMMs) for modeling acoustic characteristics of a speaker's voice in a text-independent scenario has been proposed and evaluated by a number of researchers (See., e.g., REYNOLDS et al). A GMM is a weighted linear combination of M unimodal Gaussian densities and is characterized by a parameter set $\lambda = \{w_i, \mu_i, \Sigma_i\}$, $i=1, \ldots, M$. For a D-dimensional feature vector x, the likelihood function can be defined as $$p(x|\lambda) = \sum_{i=1}^{M} w_i p_i(x), \quad (1)$$

where $p_i(x)$ is a D-dimensional unimodal Gaussian density.

Each unimodal density $p_i(x)$ is parameterized by a D×1 mean vector $\mu_i$ and a D×D covariance matrix $\Sigma_i$. In speaker verification applications, it may be sufficient to consider only diagonal covariance matrices in order to avoid the "curse of dimensionality" problem.

The density $p_i(x)$ can be expressed as $$p_i(x) = \frac{1}{(2\pi)^{(\frac{D}{2})}|\Sigma_i|^{(\frac{1}{2})}} \exp\left\{-\frac{1}{2}(x - \mu_i)(\Sigma_i)^{-1}(x - \mu_i)\right\}. \quad (2)$$

While not specifically shown in FIG. 2, during the enrollment phase, the maximum likelihood estimate (MLE) of the parameter set ($\hat{\lambda}_k$) for speaker k (k=1, 2, ..., N, where N is the number of speakers enrolled in the database) is obtained as follows. A large pool of training vectors (cepstral features) is computed from a number of speech samples uttered by a diverse population of speakers. These training vectors are used to estimate the parameters ($\hat{\lambda}_b$) of a universal background model (UBM).

Next, an iterative expectation-maximization (EM) algorithm is used for the estimation of $\hat{\lambda}_b$ from the training vectors. The parameter set $\hat{\lambda}_k$ for the target speaker is derived from the parameter set $\hat{\lambda}_b$ through a Bayesian Maximum Aposteriori (MAP) adaptation algorithm.

To verify the identity of a user, cepstral features are extracted from the person's speech sample and for each test vector x, the log-likelihood ratio is computed as $\S_k(x) = \log p(x|\lambda_k) - \log p(x|\lambda_b)$. If the average log-likelihood ratio for all the test vectors ($\overline{S}_k$) is greater than or equal to a threshold T, then the user's identity claim is accepted. On the other hand, the user's claim is rejected if the average log-likelihood ratio is less than the threshold T.

As may be appreciated by those skilled in the art, some of the advantages associated with this GMM-based approach to speaker verification include the easy computation of the likelihood function and the insensitivity to the temporal aspects of speech thereby making it well-suited for text-independent tasks.

One driving force to using GMMs for modeling the acoustic characteristics of a speaker is that individual or groups of Gaussian components can be considered as modeling the underlying broad phonetic sounds that characterize a person's voice. Although the components are not explicitly identified as belonging to individual phonemes or phonetic classes, one can consider that some form of implicit segmentation or unsupervised clustering takes place during both training and authentication. However, training Gaussian mixture models with a large number of components (usually more than 128 Gaussian components are used) using limited training data from a speaker tends to average out the phonetic information.

Recently, it has been shown (See., e.g., U. V. Chaudhari, J. Navratil, and S. H. Maes, "Multigrained Modeling With Pattern Specific Maximum Likelihood Transformations for Text-Independent speaker Recognition", IEEE Transactions on Speech and Audio Processing, vol. 11, no. 1, pp. 61-69; D. Gutman and Y. Bistritz, "Speaker Verification Using Phoneme-Adapted Gaussian Mixture Models," Proceedings of Eleventh European Signal Processing Conference (EUSIPCO), Toulouse, France, September, 2002, Vol III, pp. 85-89; and A. Park and T. J. Hazen, "ASR dependent techniques for speaker identification," in Proceedings of the Seventh International Conference on Spoken Language Processing," Denver, USA, September 2002, pp. 1337-1340) that explicitly segmenting feature vectors based on individual phonemes or phoneme classes and building finer acoustic models for each phoneme and for every speaker can lead to substantial improvement in the speaker verification accuracy. These finer models are known as phoneme specific models and they can be adapted from the phoneme-independent models using the Bayesian adaptation technique.

One disadvantages of using phoneme specific models is the need for an additional step to explicitly segment the speech samples into various phonemes. This phoneme recognition must be speaker independent and must have a reasonably high accuracy for the phoneme specific models to be meaningful.

Further, phoneme specific models also increase memory and computational requirements of the recognition system. Generally speaking, phoneme specific models can be used in text-dependent, text-prompted or text-independent speaker verification scenarios.

Figure 4:
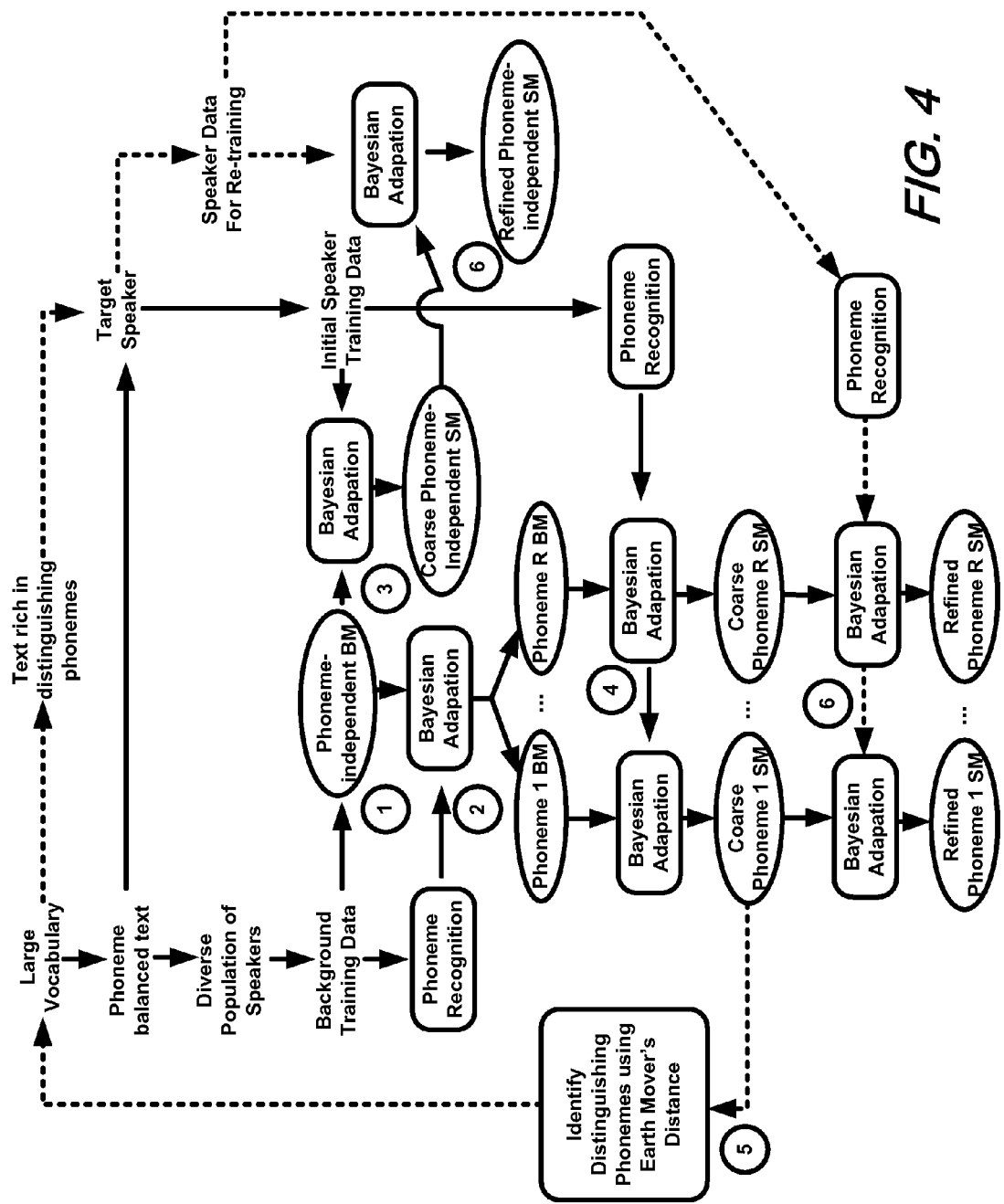
FIG. 4 shows the steps associated with a speaker adaptive training method according to the present invention.

Turning our attention now to FIG. 4, there is shown a speaker adaptive training method according to the present invention. As shown, the adaptive training method is designed for text-prompted speaker recognition. It is assumed that the text-prompting engine used has access to a large vocabulary and is capable of generating text with desired phonetic characteristics. Accordingly, the training method according to the present invention includes the following steps.

STEPS 1: Speech samples from a diverse set of speakers are segmented into frames and cepstral coefficients are extracted for each frame. Based on these feature vectors, a phoneme-independent universal background GMM (PI-BM) is constructed using an EM algorithm.

STEPS 2: Phoneme boundaries in the speech samples are identified and resulting frames are labeled using a phoneme recognizer. For each individual phoneme, a set of feature vectors corresponding to that specific phoneme is used to adapt a Pheneme-Independent Background Model (PI-BM) into a phoneme specific background GMM (PS-BM).

STEPS 3: Cepstral coefficients derived from speech samples of a target speaker are used to adapt the PI-BM into a coarse phoneme-independent speaker GMM (PI-SM). It is noted that the term "coarse" is used to describe the speaker models at this stage of processing in order to highlight the fact that these models will undergo further refinement before final speaker models are obtained.

STEPS 4: Speech samples of a target speaker are labeled using a phoneme recognizer and coarse phoneme specific speaker GMMs (PS-SMs) are obtained by Bayesian adaptation of corresponding PS-BMs using feature vectors of the target speaker corresponding to the specific phoneme.

STEPS 5: A subset of phonemes that provides the best discrimination between the target speaker and the background are identified. For purposes herein, the best subset of phonemes is identified by comparing the PS-SMs with the corresponding PS-BMs and measuring the dissimilarity between each pair of models using the Earth Mover's Distance (EMD) (See, e.g., Y. Rubner, C. Tomais, and L. J. Guibas, "The Earth Mover's Distance As A Metric For Image Retrival", *International Journal of Computer Vision*, Vol. 40, no. 2, pp. 99-121, 2000). Those skilled in the art will appreciate that a high value of EMD between a PS-SM and its corresponding PS-BM implies that the specific phoneme provides good discrimination between the target speaker and the background. Therefore—and according to an aspect of the present invention—by computing the EMD for each individual phoneme, it is possible to identify the distinguishing phonemes for a target speaker.

STEPS 6: Text for subsequent prompting is generated that is rich in only the speaker-dependent set of distinguishing phonemes. New speech samples are generated for the target speaker and these additional samples are used to further refine the PI-SM and PS-SMs corresponding to the distinguishing phonemes. Advantageously, this secondary refinement step helps in the construction of more robust models for each target speaker.

The EMD between a PS-SM and its corresponding PS-BM is computed as follows: Let $$p(x|\lambda_{r,b}) = \sum_{i=1}^{M} w_{r,b}^{i} p_{r,b}^{i}(x)$$

be the background GMM for the $r^{th}$ phoneme and $$p(x|\lambda_{r,k}) = \sum_{j=1}^{M} w_{r,k}^{j} p_{r,k}^{j}(x)$$

be the GMM for the $r^{th}$ phoneme of the $k^{th}$ speaker. It is noted that as used herein, $p_{r,b}^{i}(x)$ and $p_{r,k}^{j}(x)$ are unimodal Gaussian densities defined as in equation 2, r=1, 2, ..., R (R is the total number of phonemes) and k=1, 2, ..., N (N is the total number of enrolled speakers).

We then let $d_{r,k}^{i,j}$ be the symmetric Kullback-Leibler (KL) distance between $p_{r,b}^{i}(x)$ and $p_{r,k}^{j}(x)$. Let $F_{r,k}=\{f_{r,k}^{i,j}\}$ be the set of values that minimizes the cost function $$C_{r,k} = \sum_{i=1}^{M} \sum_{j=1}^{M} d_{r,k}^{i,j} f_{r,k}^{i,j}$$

subject to the constraints $f_{r,k}^{i,j} \geq 0$, $$\sum_{i=1}^{M} f_{r,k}^{i,j} = w_{r,k}^{j}$$

and $$\sum_{j=1}^{M} f_{r,k}^{i,j} = w_{r,b}^{j}.$$

The minimum value of the cost function $C_{r,k}$ is the earth mover's distance between the $r^{th}$ phoneme GMM of the $k^{th}$ speaker and the $r^{th}$ background phoneme GMM. The set of values $F_{r,k}$ that minimizes the cost $C_{r,k}$ can be found by solving the transportation problem (See, e.g., S. T. Rachev, "The Monge Kantorovich Mass Transference Problem and its Stochastic Applications", *Theory of Probability and its Applications*, vol. 29, no. 4, pp. 647-676, 1984) for which many near-optimal algorithms exist.

Advantageously—and according to yet another aspect of the present invention—identifying distinguishing phonemes for each target speaker facilitates the verification process. More particularly, instead of prompting a user to repeat a random phrase during authentication, the system intelligently designs phrases for the target speaker based on the identity claim made during authentication.

Figure 5:
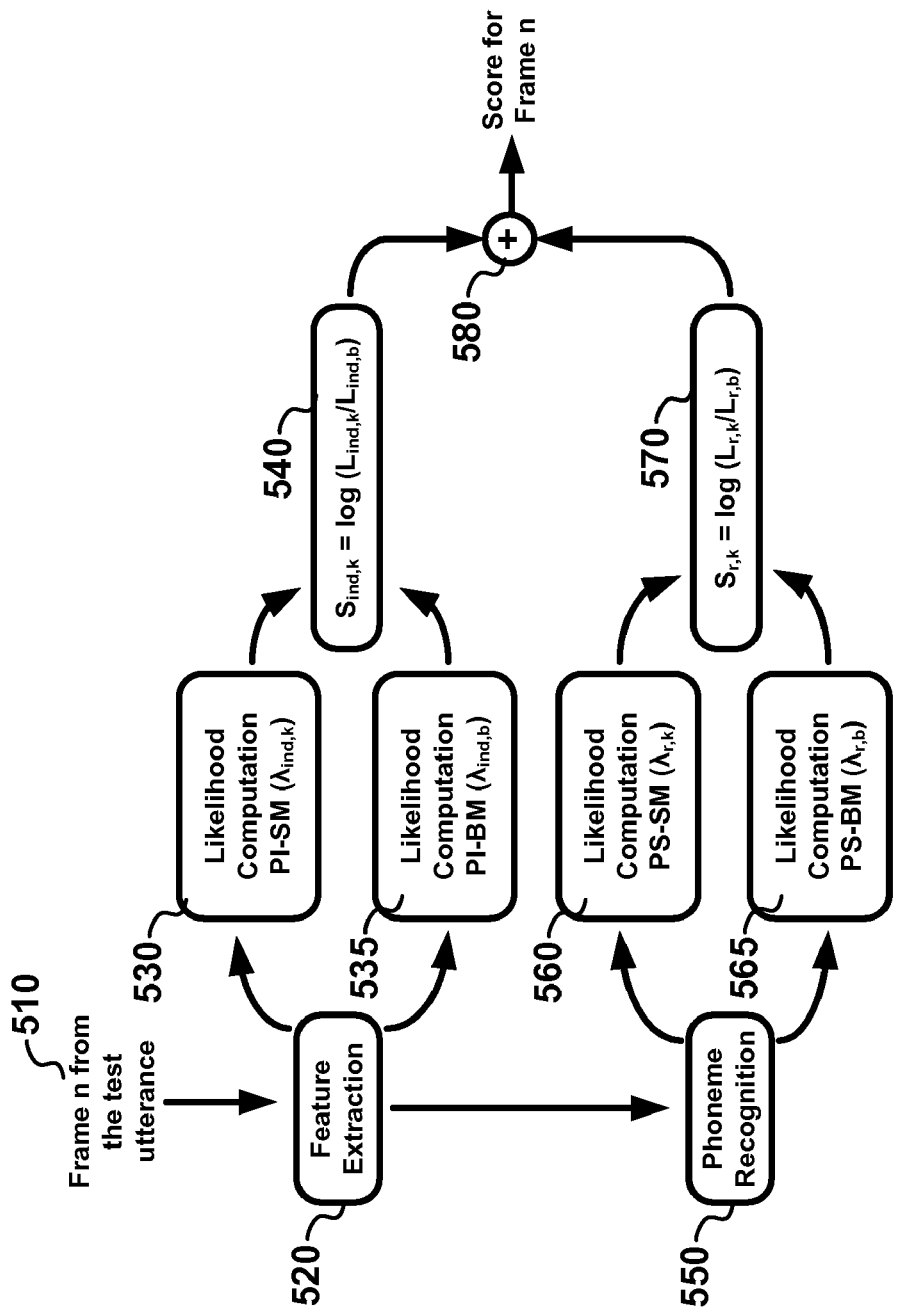
FIG. 5 shows the steps associated with computing a match score for a test feature vector according to the present invention.

Turning now to FIG. 5, there is shown the process for determining a match score for a test feature vector. Accordingly, the match score 580 for a test utterance is calculated as follows. For each feature vector (frame) in the test utterance 510, features are extracted 520 and phoneme's recognized 550 and assigned a phoneme label after phoneme recognition. A log-likelihood ratio for the feature vector under both the phoneme independent model 530, 535, 540

$$\left(S_{ind,k} = \log \frac{L_{ind,k}}{L_{ind,b}}\right)$$

and the specific phoneme model 560, 565, 570

$$\left(S_{r,k} = \log \frac{L_{r,k}}{L_{r,b}}\right)$$

are obtained. Note that here, $L_{i,j}$ represents the likelihood value $p(x|\lambda_{i,j})$, $\lambda_{ind,b}$ represents PI-BM, $\lambda_{ind,k}$ represents PI-SM for speaker k, $\lambda_{r,b}$ represents PS-BM for the $r^{th}$ phoneme and $\lambda_{r,k}$ represents PS-SM for the $r^{th}$ phoneme and $k^{th}$ speaker. A sum of the two log-likelihood ratios 580 ($S_k = S_{ind,k} + S_{r,k}$) is treated as the match score for the frame (log-likelihood that the frame was spoken by speaker k). The average match score ($\bar{S}_k$) over all the non-silent frames in a test utterance gives the match score for that utterance.

At this point those skilled in the art will readily appreciate the applicability of the present invention in a representative wireless (i.e., cellular) telecommunications network in which a cellular user makes a cellular call using a cellular terminal. According to the present invention: 1) a cellular user initiates a call between the cellular terminal and a network base station which is part of the cellular network; 2) the call is established to an additional user; and 3) after call establishment the identity of the caller is performed using techniques described previously. If it is determined that the identity of the cellular caller is as claimed, then the call is permitted to continue. If not, a variety of call handling methods are available—including termination of the call.

Of course by telecommunications network and services those skilled in the art will quickly recognize that any of a variety of traditional (voice, circuit switched, packet switched) or non-traditional (internet, voice over internet protocol, etc) or even data services wherein an individual's voice is used to authenticate the usage.

At this point those skilled in the art will recognize that the called party need not be a cellular user. The call may of course be completed to either a wireless terminal or a wired terminal as necessary. Additionally, the verification procedures may be performed for either user at each end of the call as necessary.

For example, let us assume that a calling party (i.e., "Caller") is making a call to a called party (i.e., "Called"). Let us further assume that the Caller assumes the identity of the called party to be Called. According to the present invention—a network verification system may—after call completion—make a determination about the identity of the called party. For example, notification to the caller may indicate that the presumed called party is NOT who is presently speaking on the called phone. At that point, the network may discontinue the call or offer the caller the opportunity to discontinue the call.

As can be appreciated, a nearly limitless variety of call scenarios are possible which may benefit from the present invention. Importantly, the present invention permits the verification of a telecommunications user after call completion, offering the possibility of a variety of call handling—including notification or call termination as appropriate and desired.

Accordingly, the invention should be only limited by the scope of the claims attached hereto.

What is claimed is:

1. A voice-based multimodal speaker authentication method for verifying the identity of a user of telecommunications services comprising the steps of:
    adaptively training a model of an authorized user of the telecommunications services; said adaptively training comprising the steps of:
        extracting a phoneme independent background model from background data resulting from a diverse set of speakers;
        generating a phoneme-specific background model from the diverse set of speakers;
        generating a phoneme-specific speaker model for the authorized user;
        comparing the phoneme-specific background model and the phoneme-specific speaker model; and
        determining from the comparison relative discriminative abilities of the two models;
    establishing a telecommunications service between one or more users of the telecommunications service wherein the one or more users employ a voice-based communications method;
    determining after establishment of the telecommunications service between the one or more users whether the one or more users is the authorized user of the telecommunications services by authenticating the voice of the user; and
    disestablishing the established telecommunications service if the voice of the user is not the authorized user;
    identifying a number of distinguishing phonemes for the two models;
    generating text rich in the distinguishing phonemes; and
    prompting the authorized user with the generated text to further refine the models.

2. The authentication method of claim 1 wherein said discriminative abilities of the two models is determined by measuring an Earth Movers Distance.

3. The authentication method of claim 2 wherein said determining step further comprising the steps of:
    identifying one or more phrases containing distinguishing phonemes for the authorized user;
    using the identified phrases to determine whether one or more of the users is the authorized user.

4. The authentication method of claim 3 further comprising the step of prompting one or more of the users to speak the identified phrases.

5. A voice-based multimodal speaker authentication method for verifying the identity of an individual comprising the steps of:
    adaptively training a model of the individual wherein said adaptive training comprises the steps of:
        extracting a phoneme independent background model from background data resulting from a diverse set of speakers;
        generating a phoneme-specific background model from the diverse set of speakers; and
        generating a phoneme-specific speaker model for the individual;
        comparing the phoneme-specific background model and the phoneme-specific speaker model; and
        determining from the comparison relative discriminative abilities of the two models; and
        generating text rich in the distinguishing phonemes; and
        identifying a number of distinguishing phonemes for the two models prompting the individual with the generated text to further refine the models; and using the models to determine whether a voice is that of the individual.

6. The authentication method of claim 5 wherein said discriminative abilities of the two models is determined by measuring an Earth Movers Distance.

7. The authentication method of claim 6 wherein said determining step further comprising the steps of:

identifying one or more phrases containing distinguishing phonemes for the individual;

using the identified phrases to determine whether the voice is that of the individual.

8. The authentication method of claim 7 further comprising the step of prompting one or more individuals to speak the identified phrases.

* * * * *